Aug. 27, 1957  J. E. BABOZ  2,803,992
APPARATUS FOR PHOTOGRAMMETRIC PLOTTING
Filed March 20, 1956  3 Sheets-Sheet 1

INVENTOR
JEAN EUGENE BABOZ

BY Cameron, Kerkam & Sutton
ATTORNEYS

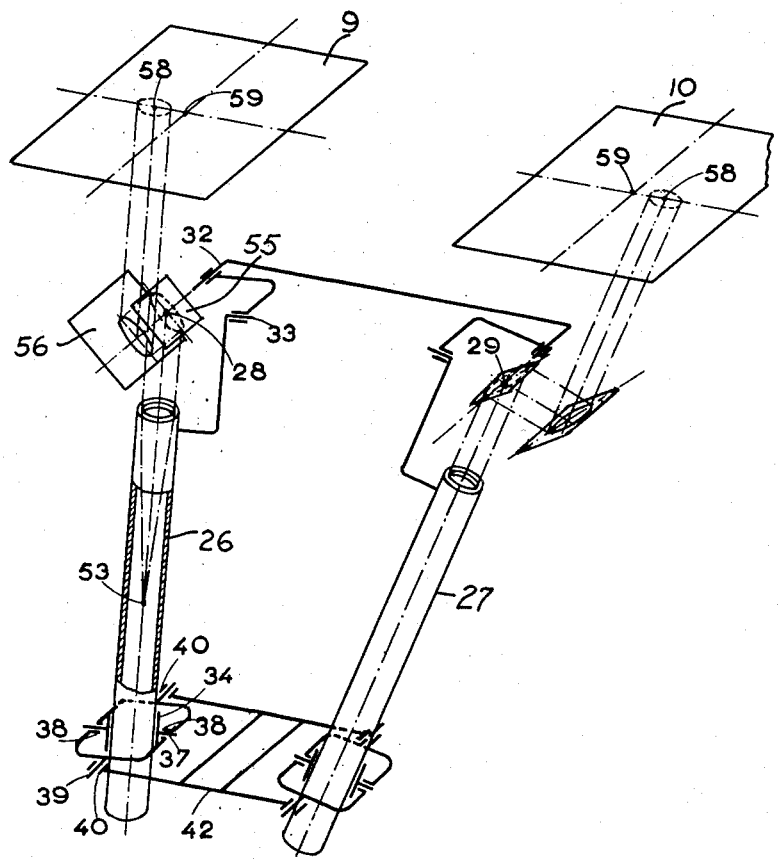

Aug. 27, 1957 J. E. BABOZ 2,803,992
APPARATUS FOR PHOTOGRAMMETRIC PLOTTING
Filed March 20, 1956 3 Sheets-Sheet 3
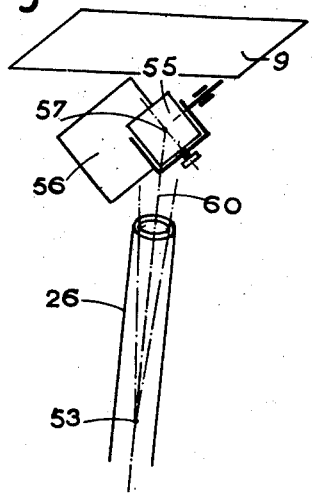
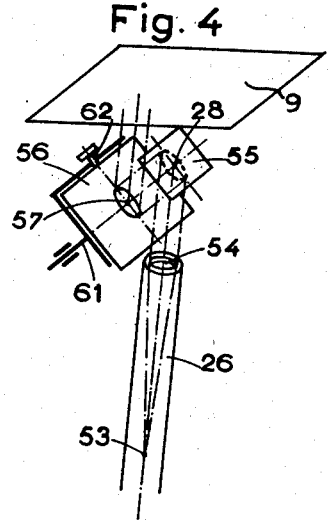
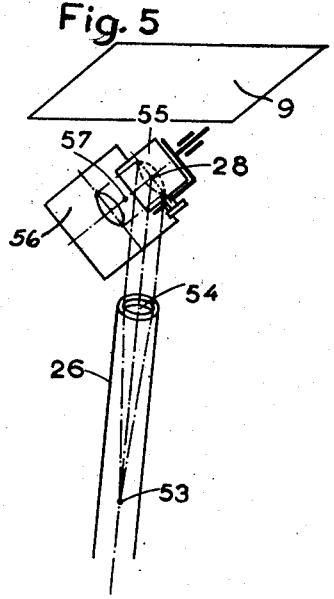
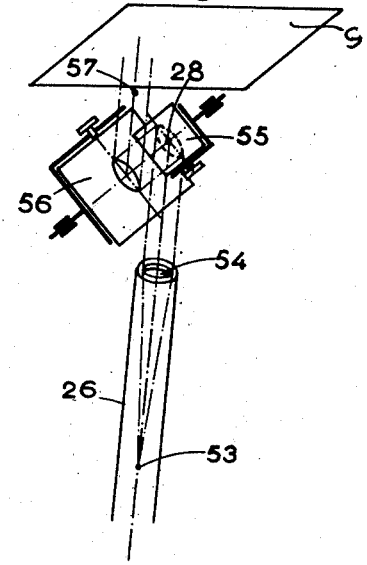
INVENTOR
JEAN EUGENE BABOZ
BY Cameron, Kerkam & Sutton
ATTORNEYS

United States Patent Office 2,803,992
Patented Aug. 27, 1957

2,803,992

APPARATUS FOR PHOTOGRAMMETRIC PLOTTING

Jean Eugene Baboz, Paris, France, assignor to Societe d'Optique et de Mecanique de Haute Precision, Paris, France Application March 20, 1956, Serial No. 572,707

Claims priority, application France March 29, 1955

7 Claims. (Cl. 88—24)

The invention relates to an apparatus for photogrammetric plotting or mapping of the type which permits one to ascertain the shapes or contours of an object, for example of the ground, from two photos taken of this object from two different points of view.

Such apparatuses are applicable in particular for preparing maps by means of views of the ground from the air.

The invention relates especially to apparatuses for photogrammetric plotting permitting one to ascertain the shape of an object from two photos forming a stereoscopic pair taken from two different points of view and arranged on a support, this apparatus comprising a pair of rods, each of which is articulated on the one hand to a point embodying the point of view, and on the other hand to a so-called plotting carriage adapted to perform translation movements parallel to a so-called reference plane, and moreover to a displacement perpendicular to this plane, one point of this reference carriage embodying the tracer point or marking stylus for forming the plotted point. This apparatus permits one therefore to project this plotted point on to the reference plane, and to ascertain its bearings or relative positions thereon.

An apparatus of this type has been described for example in the French patent specification No. 970,860 and in the United States patent specification No. 2,647,317 filed in the name of Mr. Poivilliers.

In the apparatus described in the patent specifications mentioned hereinabove there are two rods embodying the homologous perspective rays in space which correspond to the two associated views forming a stereographic pair.

There is likewise to be found another plane of reference above which moves the plotting carriage having the two homologous rods. Finally there is also the support upon which the two negatives are arranged.

In the patent specifications cited hereinabove the two photographs are observed by means of a binocular microscope comprising in each branch a visor mark, the merging of these two visor marks in the course of the binocular observation making appear a single mark serving as a stereoscopic pointer. These patent specifications describe moreover more or less complicated mechanical devices which allow one to observe the photographs in a plane independently of the orientation the photos have relative to one another at the moment when the views are taken.

The invention relates to an apparatus in which the orientation of the two photos relative to one another does not involve any mechanical complications, and wherein the visor marks or the marks used for pointing out the homologous points of the photos are formed in a very simple manner without any possible error, starting from the homologous rods themselves which embody the homologous perspective rays in space at the moment of taking the views.

According to the invention each of the rods comprises an illuminating device emitting a beam of light, of which one ray at least is parallel to, or merged with, the axis of the rod, and a mark is arranged on the trajectory of the ray in such a manner as to be projected on to the corresponding photo.

Moreover, at least two mirrors may be arranged on the trajectory of the luminous beam between each rod and the corresponding photo and the orientation of at least one of these two mirrors permitting one to obviate the orientation of the photos for taking into account the positions thereof relative to one another at the moment of taking the views.

Other features of the invention will become clear in the course of the following description of embodiments of an apparatus comprising two mirrors each associated to one of the said rods.

Figure 2 is a diagrammatic view of the part of the apparatus illustrated in Figure 1 which corresponds to the invention.

Figures 3 to 6 illustrate one of the rods with its two associated mirrors, and the mark, the projection of which, is to be formed on the corresponding photo.

Figure 1:
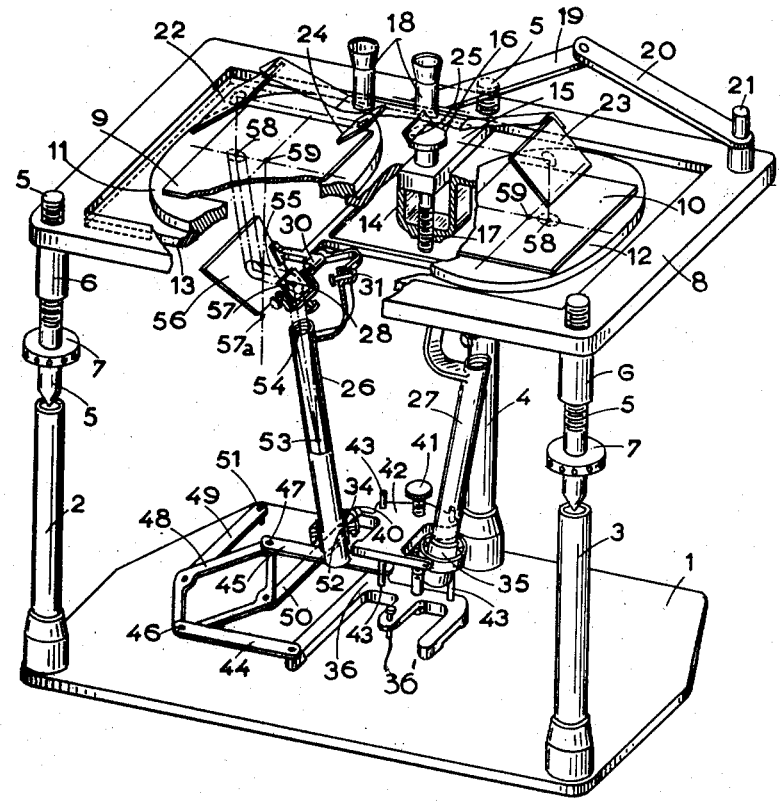
Figure 1 is a partly broken-off perspective view of an apparatus including the improvements according to the invention.

The apparatus illustrated in Figure 1 comprises a reference plane or mapping surface 1 upon which are fixed three supporting columns 2, 3 and 4, on which rests the upper supporting portion of the apparatus by means of screws 5 engaged in tapped sleeves 6, and operated by means of knobs 7.

The operation of the screws 5 permits one therefore as known from the patent specifications referred to hereinabove to orientate readily the portion 8 which supports the pair of photos with respect to the plane of reference 1.

For the purpose of orientating each one of the photos 9 and 10 in its plane the same are placed on platforms 11 and 12 rotatable on a support 13 the middle portion 14 of which presents in general the form of a gutter or depression passing below a bridge 15 fixedly connected to the portion 8.

A screw 16 passes through the bridge 15 and engages in a screw thread 17 tapped into the lower portion of the gutter. The screw 16 permits accordingly to adjust the level of the photos 9 and 10 with respect to the portion 8, and consequently to take into account the focal length of the photographic camera.

The photos 9 and 10 are observed by means of a binocular microscope 18 which comprises mirrors 22, 23, 24 and 25. It is mounted on articulated arms 19 and 20 pivotally mounted on an axle 21 fixedly attached to the portion 8.

The apparatus comprises also two rods 26 and 27 embodying the homologous perspective rays in space corresponding to the associated photos 9 and 10.

Each of the rods can swing about a pivot point 28 or 29 embodying the respective points of view in space. The swinging of each rod is obtained owing to a system of the cordon-joint type constituted by the sleeves 30 and 31 mounted pivotally about two perpendicular axes 32 and 33, respectively.

Each of these rods can on the other hand slide in a sleeve 34 or 35 suspended cordon-joint fashion on a carriage 42. The sleeve 34 comprises for example an axle 37 journalled in bearings 38, the latter being fixedly connected to an axle 39 perpendicular to the axle 37, the axle 39 being journalled in bearings 40 fixedly connected to the carriage 42 which is carried along by a platform 36.

The carriage 42 may be displaced on the platform 36 perpendicular to the plane of reference 1, owing to a screw 41 engaged in a screw thread tapped into the carriage 42. This displacement is guided by two rods 43, The screw 41 abuts on the platform 36, and by turning the screw the carriage is, well understood, raised or lowered.

The platform 36 is articulated to two connecting rods 44 and 45, the latter being themselves articulated 46 and 47 to a parallelogram shape piece 48, which piece is articulated to two connecting rods 49 and 50 pivotally mounted on the axles 51 and 52 of the plane of reference 1.

The combination of the connecting rods 44, 45, 49, 50 and of the piece 48 allows a translation of the platform 36 without rotation.

Platform 36 supports the marking stylus or tracer point generally indicated at 36' for forming the plotted point when platform 36 is moved by the user of the apparatus.

With each of the rods 26 or 27 an illuminating device is combined which in the case of Figure 1 comprises a point-shaped light source 53 and a collimator 54 in the corresponding rod 26 which accordingly is hollow.

The point-shaped light source 53 is placed in the focus of the collimator 54, and from the rod 26 accordingly a beam of rays emerges, which are parallel to one another and to the axis of the rod. This beam reaches a mirror 55 on which it is reflected, undergoing a second reflexion on a mirror 56 before reaching the photo 9.

An analogous illumination device is provided in the rod 27 for sending a luminous beam on to the photo 10.

In the case of Figure 1, a mark 57 is arranged at the centre of the mirror 55, that is to say at the point 28 about which the mirror oscillates owing to its cordon joint suspension. The mark 57 does not therefore vary its position in the course of the movements of the mirror 55.

The pivotal movements of the mirror 55 allow to compensate for the differences of orientation between the photos 9 and 10 at the moment when they were taken. The movements of mutual orientation which would have to be taken on the apparatus are replaced by the movements of orientation of the mirrors 55.

The marks 57 are projected at 58 on to the photos 9 and 10 at homologous points which are being observed by the binocular microscope 18. When the platform 36 is displaced, at the same time the orientation of the rods 26 and 27 is modified, and the projections 58 of the marks on the photos are displaced. One has therefore to displace simultaneously the binocular microscope in order to continue the observation.

Preferably the apparatus is so adjusted that the projection 58 of the mark finds itself in the centre 59 of one or the other of the photos when one or the other of the rods 26 and 27 is perpendicular to the plane of reference 1, in order that the corresponding mirrors 55 and 56 may be parallel, and that the photos are parallel to the plane of reference.

Subsequently the level position of the photos 9 and 10 is adjusted by means of the screw 16, in order that the conjugated image 57a of the mark 57 in the corresponding mirror 56 may be at a distance from the photo equal to the focal length $p$ of the photographic camera. In the case where the mark was between the mirror 56 and the corresponding photo, the position of the photo would be so adjusted that the distance between the mark itself and the corresponding photo may be equal to $p$.

Figures 3 to 6 illustrate some modifications.

In fact, if the mark 57 is in the centre of the mirror 55, this is to say at the intersection of the mirror with the light ray 60 positioned in the axis of the corresponding rods 26 or 27, there is a light ray coinciding with the axis of the rod 26 which passes through the mark and forms there an image of the mark in the plane of the photo. It is then not absolutely necessary to use a collimator 54. In Figure 3 the collimator has been dispensed with.

Figure 4 illustrates the case where the mark 57 is situated on the mirror 56. In this case the mirror 55 is fixed and the mirror 56 is the one that can oscillate cordon-joint fashion about the mark 57. The collimator 54 is not absolutely necessary in this case, and without a collimator it suffices if the rod, on the axis of which the point-shaped light source 53 is situated, swings about a point of its axis coinciding with the conjugated image in the mirror 55 of the mark 57. The mirror 56 may be mounted cordon-joint fashion by means of a device analogous to that used for the mirror 55 and comprising two pivot axes 61 and 62 perpendicular to one another.

Figure 5 represents the case where the mark 57 is situated between the two mirrors. In this case it is necessary to have a collimator 54 in order to make sure that there is always a ray which originally is parallel to the axis of the rod 26 and which passes through the mark 57. The mirror 56 is fixed and the mirror 55 is the one which is articulated cordon-joint fashion as in the example illustrated in Figure 1.

Finally, in Figure 6 the mark 57 is illustrated to lie after the second mirror. There also the rod 26 ought to comprise a collimator 54 in order to emit a beam of parallel rays which are reflected by the two mirrors, and one is then sure that the light ray which passes through the mark 57 is parallel to the axis of the rod 26 at the moment it leaves this rod.

In the case of Figure 6, any one of the mirrors 55 and 56, or both of them may be mounted swivelling by means of a cordon-joint system.

The apparatus described hereinabove is used in the following manner:

The photos 9 and 10 are placed on to the supports where they are oriented in their planes so as to take into account the drift of the aircraft at which the two photos were taken at different moments.

In an apparatus of the kind illustrated in Figure 1, the mirrors 55 are swung in such a manner as to take into account the difference in the inclinations of the photos at the moments when the exposures were made.

It remains to observe the photos by means of the binocular microscope and to adjust the displacements of the marks, by manoeuvring the platform 36 and the carriage 42, in order that the projections 58 of the marks 57 may be situated at homologous points of the photos.

The observation is carried by the binocular microscope displaced parallel to the plane of the photos simultaneously with displacing the platform 36.

The apparatus according to the invention does not therefore require any complicated mechanical device for adjusting the orientation of the photos 9 and 10 relative to one another, the latter remaining always in their fixed planes. It is no longer necessary to use a visor mark in the binocular microscope since the index is constituted by the projection of each mark on the two photos which projections are merged with one another in the microscope.

Well understood, the invention is not limited to the embodiments described hereinabove.

For example the marks may be constituted either by a dark spot, or by a removal of a small part of the reflecting surface of the mirrors 55 or 56, and the mark would then appear dark on the photos.

It is likewise conceivable, for example in the case of Figure 1, to leave only a very small part of the reflecting surface of the mirror 55 in the centre of this mirror. Then only those rays are reflected which reach the centre of the mirror, which thus constitutes a luminous mark the projection of which is bright on the corresponding photo.

Finally the illuminating device need not be arranged in the interior of the rods 26 and 27 but could be fixed outside these rods or on the rods themselves, or even connected to the same by any system of articulation assuring the parallelism of the luminous bundle or of the useful ray which hits the mark, with the axis of the rods. Important is merely that the ray reaching the mark is the one that remains parallel to the axis of the corresponding rod when emerging from the illuminating device.

What I claim is:

1. Apparatus for the restitution of images from a pair of stereoscopic photographs for photogrammetric plotting comprising a binocular telescope means for viewing said photographs and for use in guiding the marking stylus for forming the plotted point, a pair of rectilinear rods, means for articulating each of said rods at a point adjacent one end thereof which embodies the point of view, a plotting carriage, manual means for moving said carriage, means for each of said rods at its other end articulating said rod to said carriage, means on said carriage for embodying the said marking stylus plotted point, a source of a beam of light mounted on each of said rods, at least one ray of each of said beams being parallel to the axis of its respective rod, a mark mounted in the path of each of said rays and means for projecting each of said marks on its respective photograph for viewing by said binocular telescope.

2. Apparatus as described in claim 1 in which said rays parallel to the axes of said rods lie in the axes of said rods.

3. Apparatus as described in claim 1 including an optical collimator system mounted adjacent the end of each of said rods adjacent said photographs whereby each beam of light is shaped as a luminous cylinder.

4. Apparatus as described in claim 1 in which each of said rods is hollow and each of said sources of light is mounted within its respective rod.

5. Apparatus as described in claim 1 including at least two mirrors in each of said rays of said beams of light said mark being mounted on one of said mirrors and means for orienting said mirror carrying said mark about a point which is the center of said mark whereby said mark is projected on its respective photograph.

6. Apparatus as described in claim 3 including at least two mirrors in each of said rays of said beams of light, means for mounting said mark between said mirrors in said ray as reflected and means for orienting one of said mirrors in each of said rays about the point where said ray impinges said mirror.

7. Apparatus as described in claim 3 including at least two mirrors in each of said rays of said beams of light, means for mounting said mark between said photograph and said mirror adjacent said photograph in said ray as reflected onto said photograph and means for orienting one of said mirrors in each of said rays about the point where said ray impinges said mirror.

References Cited in the file of this patent

UNITED STATES PATENTS

| | | |
|---|---|---|
| 1,467,163 | Hugershoff | Sept. 4, 1923 |
| 1,478,693 | Bauersfeld | Dec. 25, 1923 |
| 1,590,461 | Wild | June 29, 1926 |
| 2,085,498 | Horner | June 29, 1937 |
| 2,492,870 | Kelsh | Dec. 27, 1949 |
| 2,552,975 | Kelsh | May 15, 1951 |
| 2,574,123 | Santoni | Nov. 6, 1951 |
| 2,647,317 | Poivilliers | Aug. 4, 1953 |
| 2,693,129 | Nistri | Nov. 2, 1954 |
| 2,744,442 | Mosher | May 8, 1956 |
| 2,753,756 | Santoni | July 10, 1956 |